Oct. 13, 1931.  H. A. YEIDER  1,827,130
SELECTOR MECHANISM
Filed Aug. 6, 1928  6 Sheets—Sheet 1
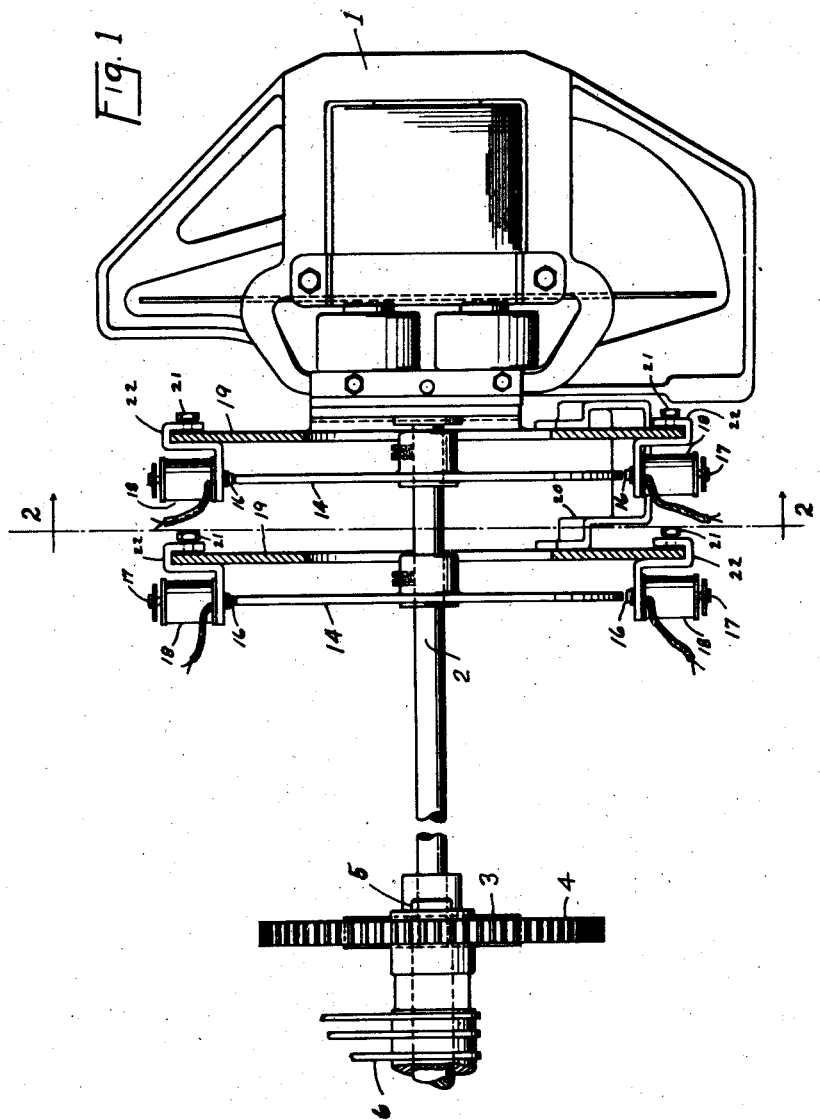
Witness.
Geo L Chapel
INVENTOR.
Harry A. Yeider
BY Cyrus N. Rice
ATTORNEY.

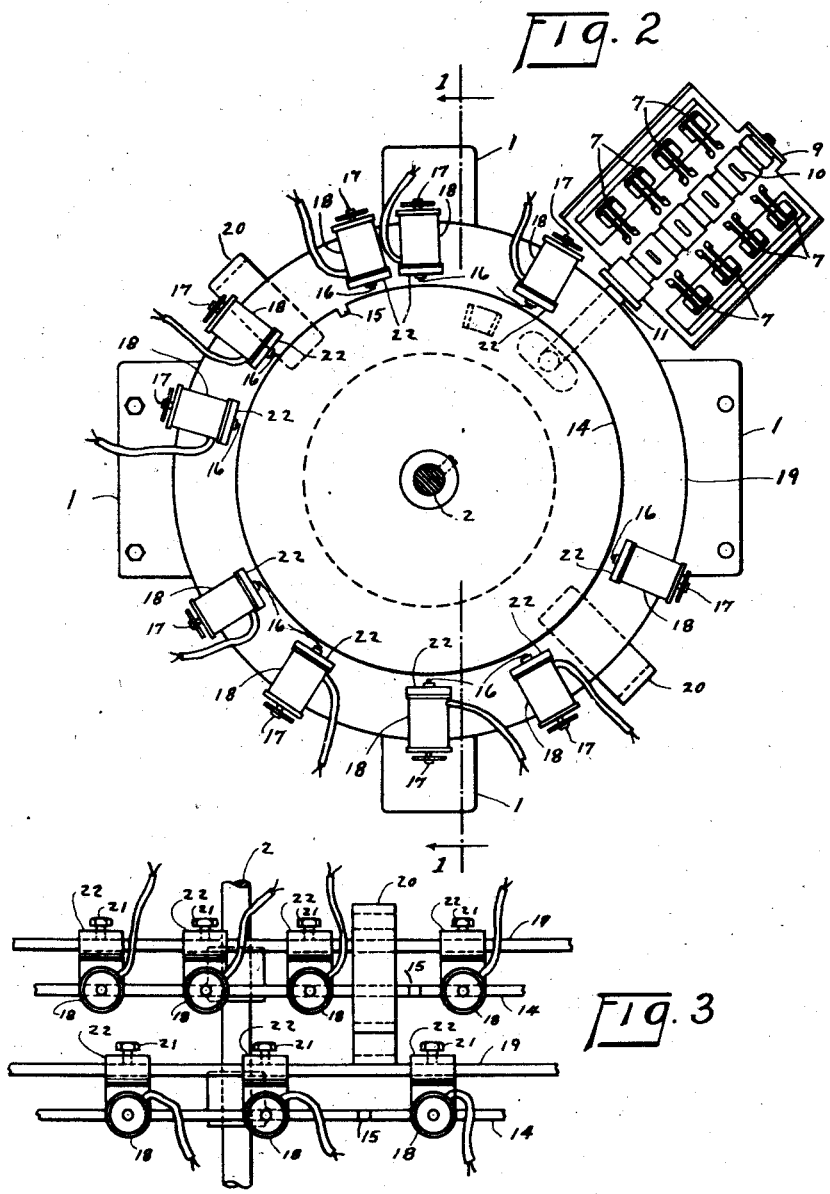

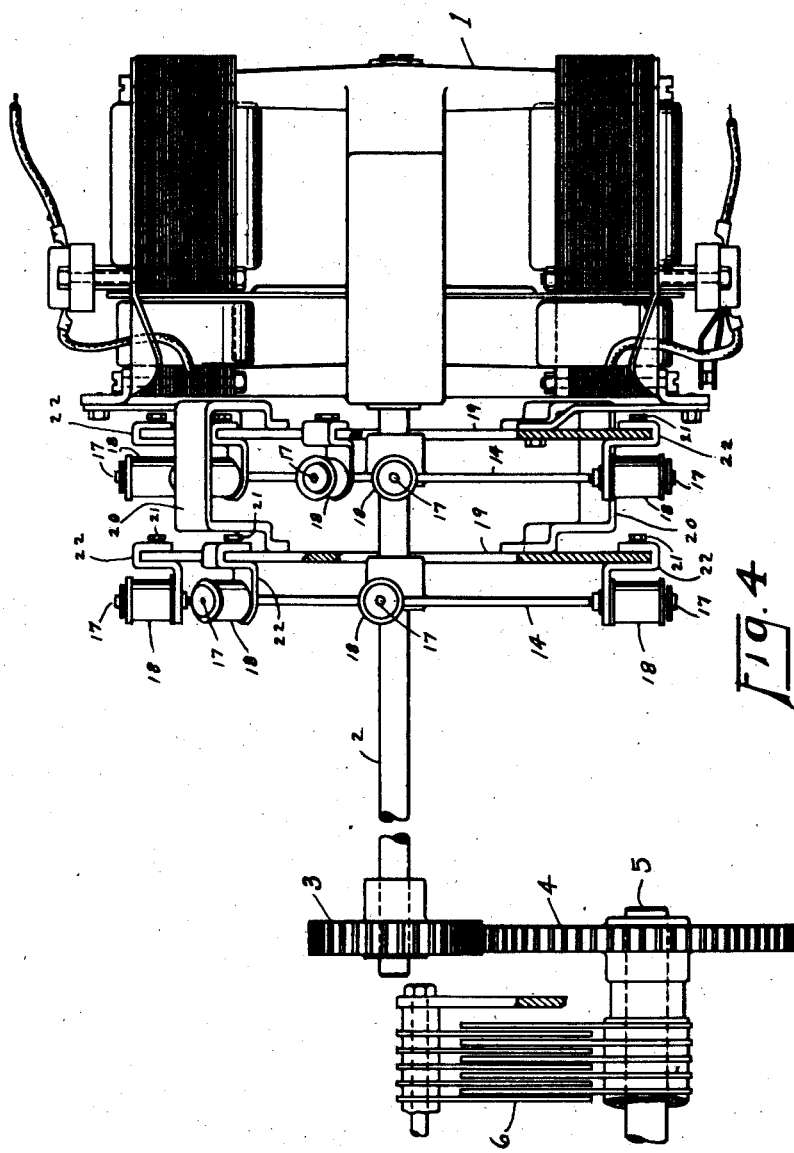

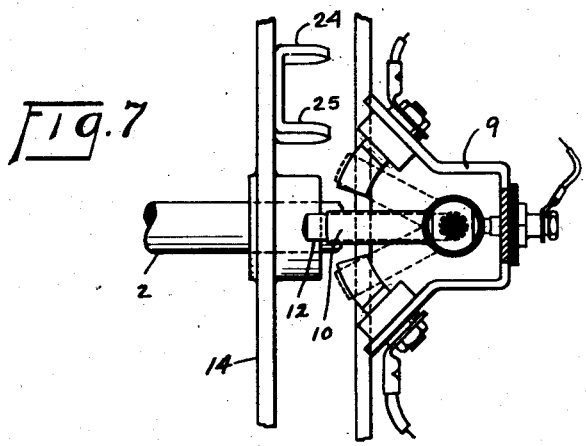
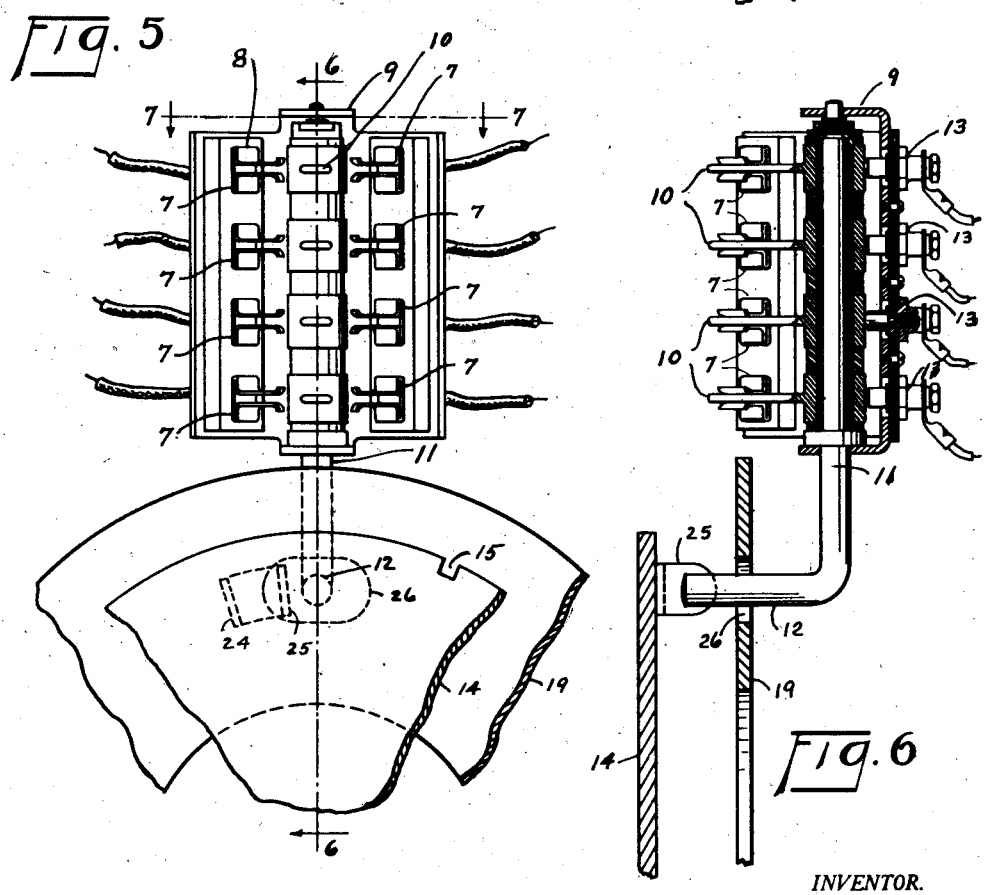

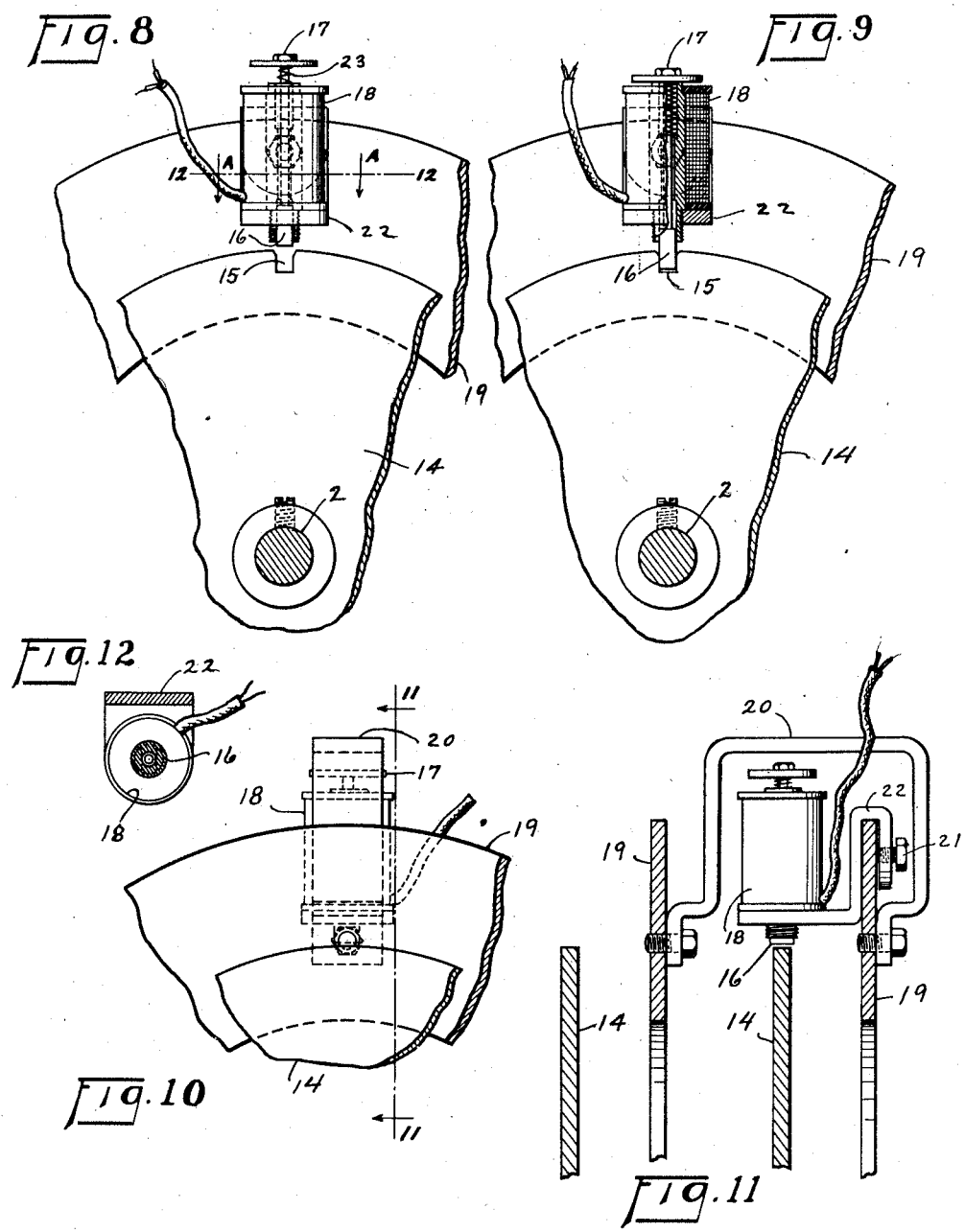

Oct. 13, 1931.  H. A. YEIDER  1,827,130
SELECTOR MECHANISM
Filed Aug. 6, 1928  6 Sheets-Sheet 6
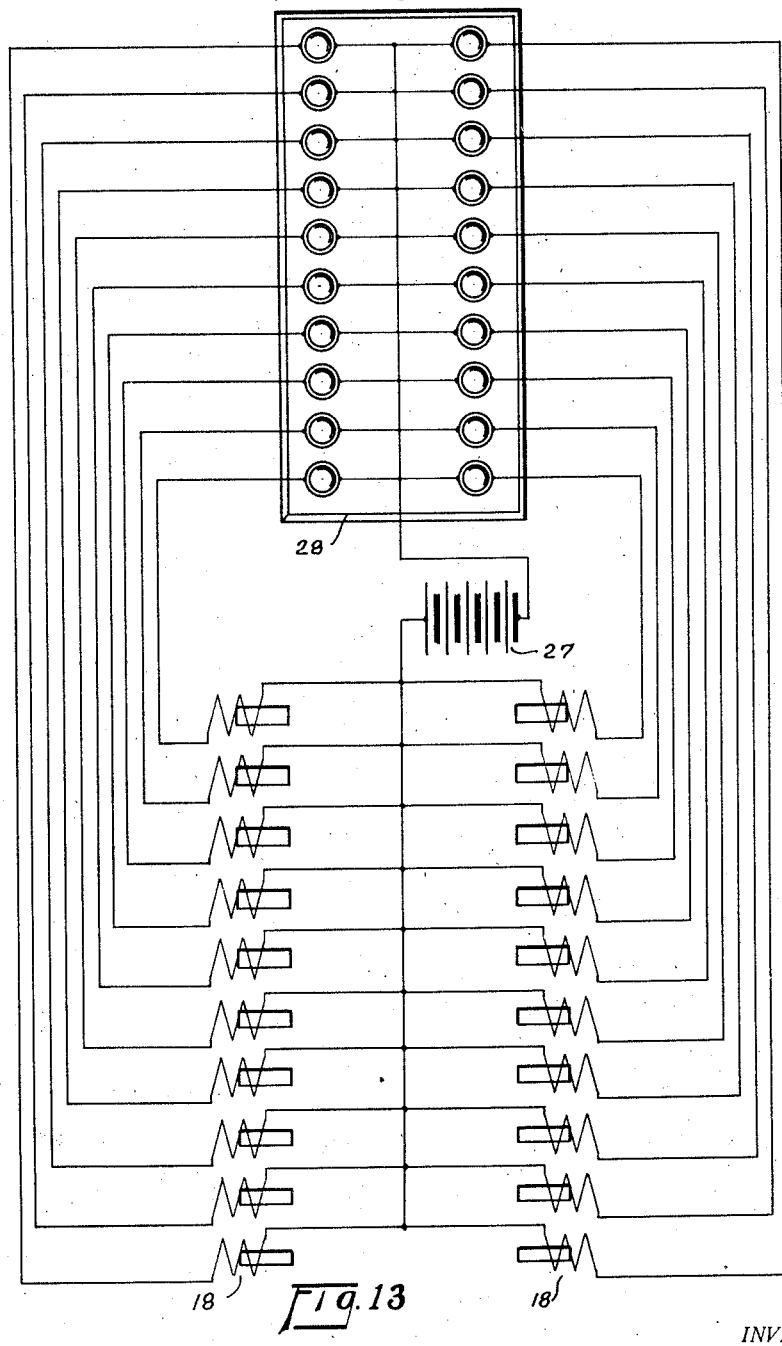
INVENTOR.
Harry A. Yeider
BY Cyrus N. Rice
ATTORNEY.
Witness.
Geo. L. Chapel Patented Oct. 13, 1931

1,827,130

UNITED STATES PATENT OFFICE

HARRY A. YEIDER, OF GRAND RAPIDS, MICHIGAN, ASSIGNOR TO AUTOMATIC MUSICAL INSTRUMENT COMPANY, OF GRAND RAPIDS, MICHIGAN, A CORPORATION OF DELAWARE

SELECTOR MECHANISM

Application filed August 6, 1928. Serial No. 297,817.

This invention relates to a selector mechanism particularly useful for operating the variable condensers of a radio receiving set but which is not limited to such use.

The main objects of this invention are to provide a selector which can be operated and controlled at a remote distance from the device; to provide a selector mechanism which has unlimited flexibility as to the number and points of selected positions, and to provide a selector mechanism of simple construction and efficient operation.

An illustrative embodiment of this invention is shown in the accompanying drawings, in which:—

Fig. 1 is a view in side elevation of the selector mechanism with the selector unit supporting frame shown in section taken on the line 1—1 of Fig. 2.

Fig. 2 is a view of the same taken on the line 2—2 of Fig. 1.

Fig. 3 is a fragmentary plan view of a number of selector units mounted on their supporting frames, the view being as though the curved frame were straightened out to better show their relative positions.

Fig. 4 is a top plan view of the selector mechanism connected to the rotor of a variable condenser.

Fig. 5 is an enlarged detail in elevation of the induction motor reversing switch.

Fig. 6 is a sectional view taken on the line 6—6 of Fig. 5.

Fig. 7 is a sectional view taken on the line 7—7 of Fig. 6.

Fig. 8 is an enlarged fragmentary detail in elevation of one of the solenoid selector units showing the armature in retracted position.

Fig. 9 is a view of the same with the armature in operative position, a portion of the coil being shown in section.

Fig. 10 is an enlarged fragmentary detail showing the bracket for supporting the selector unit frame.

Fig. 11 is a sectional view taken on the line 11—11 of Fig. 10.

Fig. 12 is a sectional view taken on the line 12—12 of Fig. 8.

Fig. 13 is a view of the wiring diagram of a selector mechanism having twenty points of selection.

In the construction shown in the drawings a standard type of disc rotor induction motor 1 has an armature shaft 2 connected through reduction gears 3 and 4 to a shaft 5 which carries the rotor plates of a variable condenser 6. In the adaptation of this selector mechanism to variable condensers of the customary design the gear ratio is such that one revolution of the armature shaft 2 will move the rotor plates of the condenser from their minimum to maximum positions.

Means are provided for reversing the direction of the rotation of the armature shaft 2 at each revolution thereof and comprise two banks of switch contacts 7 and 8 mounted in vertical spaced relationship in circumferentially opposed position on a frame 9 which co-operate with a series of switch arms 10 rigidly mounted on, and insulated from a vertically disposed shaft 11 journalled on the frame 9. The lower end of the shaft 11 is turned out at right angles to the axis of the shaft to provide an arm 12 for rotating the shaft so as to cause the switch arms 10 to engage either of the banks 7 or 8 of switch contacts.

The banks 7 and 8 of switch contacts are wired to the coils of the induction motor 1 and the switch arms have sliding contact with suitable brushes in brush mountings 13 which are also connected by suitable wiring with the coils of the induction motor so that when the switch arms are in engagement with one bank of switch contacts the induction motor will rotate in one direction and when in engagement with the other bank of switch contacts it will rotate in the opposite direction.

Means are provided for stopping rotation of the induction motor at any exact, desired point and comprise a series of wheels or discs 14 rigidly secured to the armature shaft 2 each of which has an aperture or notch 15 in the periphery thereof which is adapted to receive a detent 16 integrally formed on an armature 17 of a solenoid coil 18. Any number of solenoid coils 18 may be provided and they are rigidly mounted on frames 19 which in turn are rigidly mounted on the frame of the motor 1. The frame 19 that is adjacent the motor frame is mounted directly thereon and additional frames are secured in spaced parallel relation co-axially therewith by means of brackets 20. The position of any solenoid coil may be adjusted by a set screw 21 threaded through a bracket 22 which embraces the marginal edge of the frame 19 and which supports the coil.

The end of the armature 17 opposite the end which carries the detent 16 is surrounded by a helical compression spring 23 which normally urges the armature outwardly so as to keep the detent 16 in a retracted position. Energizing of the coil causes the armature to move axially through the coil against the action of the compression spring 23 to bring the detent 16 into contact with the peripheral edge of its respective disc 14 upon which it rides until it comes in registry with the notch 15 therein at which time the detent enters the notch and prevents further rotation of the motor.

The tendency of the motor to continue its rotation binds the detent 16 in the notch 15 until the current is cut off from the motor 1 at which time the compression spring 23 will restore the armature to its original position with the detent 16 retracted.

The disc 14 adjacent to the motor 1 is provided with a pair of spaced lugs 24 and 25 rigidly mounted thereon in position to engage the outer end of arm 12 which extends into the path of rotation of said lugs through a slot 26 in the frame 19.

In the embodiment shown, the selector mechanism is shown provided with twenty of the solenoid coils 18 and as shown in the wiring diagram of Fig. 13, these coils may be connected through a suitable source of current 27 to a switch block 28 which has push buttons of the required number mounted thereon. A suitable flexible cable having a sufficient number of conductors therein may be used for the push button block so that this switch block may be carried around to various parts of a room or the like. Thus a person seated in a chair positioned distantly from a radio may control the selector mechanism so as to tune in any radio station desired to which one of the coils has been adjustably positioned.

In the operation of this selector mechanism, a suitable "on" and "off" switch (not shown) may be provided in the push button board for connecting and disconnecting the motor 1 to a suitable source of current. A suitable relay may also be provided in this line for closing the circuits to the various radio units when the selector mechanism is used in connection therewith. After the circuit has been closed, the induction motor 1 will rotate substantially one revolution at which time one of the lugs 24 or 25 will engage the arm 12 of the reversing switch and swing the arm over to its opposite position so as to engage the bank of switch contacts opposite to the bank to which it was engaged when the motor was started. The motor is thus reversed and the disc 14 will rotate in the opposite direction until the opposite lug 24 or 25 engages the opposite side of the arm 12 of the reversing switch.

This movement of the motor is continued until one of the buttons on the push button board 28 is depressed to close the circuit to one of the solenoid coils 18. Energizing of the coil causes the armature 17 thereof to move inwardly against the action of the compression spring 23 and cause the detent 16 to ride on the peripheral surface of its respective disc 14. When the notch 15 comes in registry, detent 16 will enter the notch and prevent further rotation of the motor. The position of this energizing coil has been suitably adjusted by the set screw 21 on its frame 19 so that when the detent 16 enters the notch 15 the armature shaft 2 and any mechanism connected thereto will be in the desired predetermined selected position. When used in connection with a radio receiving set, adjustment is made so that the variable condensers are tuned to a certain radio station at that position.

When it is desired to release the selector mechanism the circuit to the induction motor 1 is opened and as soon as the torque is removed from the armature shaft 2 and discs 14, the compression spring 23 will withdraw the detent 16 from the notch in which it was engaged.

By providing a suitable number of discs 14 and coil supporting frames 19, the armature shaft 2 may be stopped at positions which have a very small angle from each other.

Although but one specific embodiment of this invention has been herein shown and described, it will be understood that numerous details of the construction shown may be altered or omitted without departing from the spirit of this invention as defined by the following claims.

I claim:

1. A selector of the class described, comprising an induction motor, a switch for reversing said motor, a wheel rotated by said motor, said wheel having a notch in the periphery thereof, a lug carried by said wheel for actuating said switch to reverse said motor at each revolution of said wheel, a series of detents adjacent the periphery of said wheel and means for moving said detents to enter said notch for stopping said wheel.

2. A selector comprising an induction motor, a switch for reversing said motor, a wheel driven by said motor, said wheel having a notch in the periphery thereof, a lug actuated by said motor for reversing said switch at each revolution of said wheel, a plurality of solenoids mounted adjacent the periphery of said wheel, armatures for said solenoids adapted to enter said notch for stopping the rotation of said wheel, a source of current for said solenoids and a plurality of switches for closing the circuits to said solenoids.

3. A remote control apparatus comprising a driving motor, a shaft driven by said motor, a plurality of disks carried by said shaft, said disks each having a notch cut in the peripheral edges thereof, a frame structure mounted adjacent said disks, a multiplicity of solenoid devices adjustably positioned around said frame structure and each having an armature member adapted to be projected radially against the peripheral edge of a selected disk, means operative by the movement of one of said disks for automatically reversing the direction of rotation of said shaft and the disks carried thereby at the end of each limit of travel thereof, a power source, circuit connections extending from said power source to each of said solenoid devices, and selector switches connected in circuit with each of the solenoid devices for selectively energizing a particular one of said solenoid devices for projecting the armature member thereof against the periphery of a selected disk and into the notch formed at the peripheral edge thereof when said disk moves to a position in alignment with the solenoid device thus energized for arresting the rotation of said shaft at a predetermined position.

4. A remote control apparatus comprising a driving motor, a rotatable shaft adapted to be driven by said motor, a multiplicity of disks carried by said shaft, each of said disks having a notch formed in the peripheral edge thereof in differing angular positions, reversing means operated by the travel of one of said disks for periodically changing the direction of movement of said rotatable shaft at the limit of travel thereof in one direction, a frame structure, a multiplicity of solenoid devices adjustably positioned radially of said frame structure, detents operative by each of said solenoid devices for projection in a radial direction against the peripheral edge of said disks for engaging the notch in either of said disks and arresting the movement of said shaft in a predetermined position, and independent electrical circuits for activating a selected one of said solenoid devices.

5. Remote control apparatus comprising a driving motor, a rotatable shaft driven thereby, means operated by the movement of said shaft for periodically reversing the direction of movement of said shaft at the end of each revolution thereof, a disk carried by said shaft and having a notch formed in the peripheral edge thereof, a frame structure, a multiplicity of solenoid devices adjustably positioned around said frame structure and adapted to be shifted to selected angular positions with respect to the disk, each of said solenoid devices being adapted to selectively project the detent radially against the periphery of said disk and seeking to enter the notch therein for arresting the movement thereof, and selective circuits for energizing any one of said solenoid devices for arresting the movement of said shaft at a predetermined position.

In testimony whereof I have hereunto set my hand at Grand Rapids, Michigan, this 2nd day of August, 1928.

HARRY A. YEIDER.